May 20, 1958 J. P. JOHNSON 2,835,383
FOLDING DISPLAY DEVICE
Filed Sept. 19, 1956 2 Sheets-Sheet 1

INVENTOR.
JOHN PHILLIP JOHNSON
BY
Brown, Critchlow, Flick & Peckham
His Attorneys May 20, 1958  J. P. JOHNSON  2,835,383
FOLDING DISPLAY DEVICE
Filed Sept. 19, 1956  2 Sheets-Sheet 2
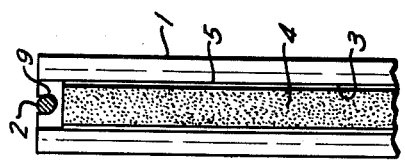
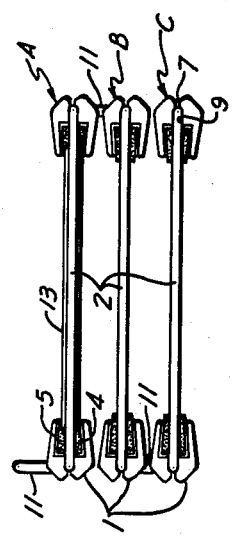
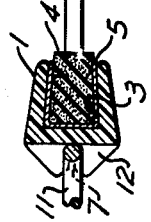
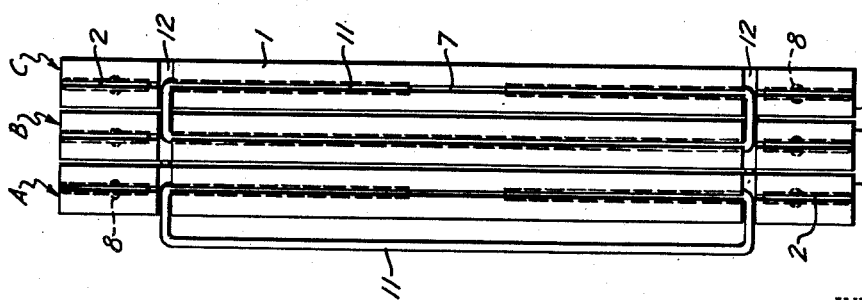
INVENTOR.
JOHN PHILLIP JOHNSON
BY
Brown, Critchlow, Flick & Peckham
His Attorneys

2,835,383

FOLDING DISPLAY DEVICE

John Phillip Johnson, Montrose, N. Y., assignor to Blue Ridge Glass Corporation, Kingsport, Tenn., a corporation of Tennessee Application September 19, 1956, Serial No. 610,816

8 Claims. (Cl. 206—82)

This invention relates to folding display devices, and more particularly to displays for samples of flat glass.

It is among the objects of this invention to provide a folding display device which is of simple and inexpensive construction, which is light in weight, which is foldable forward or backward into a compact unit that can be packed in a sample case conveniently, which permits glass samples to be quickly inserted or removed, which supports the samples by only two opposite edges, and which protects those edges from injury.

In accordance with this invention, a plurality of rectangular frames are disposed edge to edge when the display is flat or not folded. Each frame is formed from a pair of spaced parallel side bars having channels extending lengthwise of their inner sides. Each end of the frame is formed from a stiff wire secured to the ends of the bars. The bar channels are filled with compressible material, which is compressed when the edges of a flat glass sample is inserted in the channels. The frames are hinged together so that they can be folded face to face. Preferably, the outer side of each bar is provided with a longitudinal groove, the ends of which receive the bent parallel ends of the end wires. The intermediate portion of the groove then holds one side of a wire loop that forms a hinge between adjacent frames.

The preferred embodiment of the invention is illustrated in the accompanying drawings, in which:

Fig. 2 is an end view of the folded display;

Fig. 3 is an enlarged cross section of one of the frames, taken on the line III—III of Fig. 1;

Fig. 4 is an edge view of the frames while the display is folded; and

Fig. 5 is an enlarged fragmentary sectional view, taken on the line V—V of Fig. 1.

Figure 1:
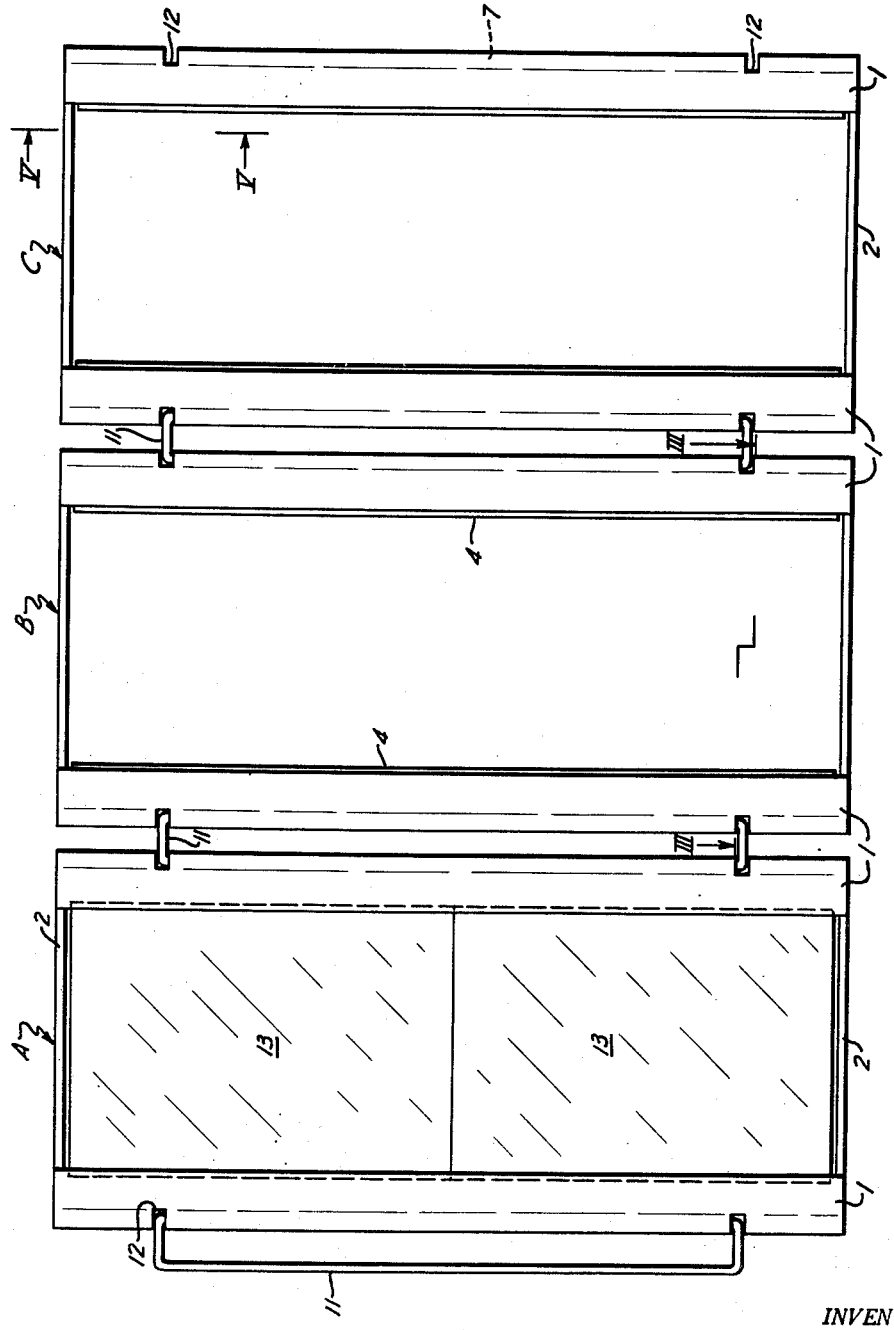
Fig. 1 is a side view of my display device extended full length, with glass samples shown in only one frame.

Referring to Fig. 1 of the drawings, the folding display device is shown in unfolded, flat condition, formed from three rectangular frames A, B and C. As will soon become apparent, any number of frames can be hinged together to provide as long a display as desired. The frames, of which the display is formed are each made from a pair of spaced parallel side bars 1 connected by stiff end wires 2. Although the side bars can be made from any material that will give them limited flexibility, a synthetic plastic is ideal because it can be extruded into the desired shape, is inexpensive, durable and light in weight. The inner side of each side bar; that is, the side facing the opposite bar of the same frame, has a channel 3 extending throughout its length, as shown in Figs. 3 and 5. The opposite sides of the channel preferably converge slightly toward its open side to help hold therein a strip 4 of compressible material, such as sponge rubber or a synthetic substitute. The channel may be reinforced by placing in it a metal channel 5 made from very thin spring metal and which will press tightly against the sides of the bar channel. The compressible strip can be inserted in the metal channel before the latter is placed in the bar channel.

The outer side of each frame bar is provided with a longitudinal groove 7 extending from end to end. Each end wire 2 has its opposite ends bent into parallel relation, and these ends are inserted in the ends of the grooves in the pair of side bars that the wire bridges. The parallel ends of the wire may be swaged to form lateral projections or teeth 8 (Fig. 4) that will dig into the walls of the grooves to help hold the wires in place. For the same reason and also for another one that will be explained presently, the distance between the edges of each groove is less than the diameter of the wire. In other words, each groove preferably is curved in cross section for more than 180°, so that the wires cannot be inserted or removed through the open side of the groove without forcing the edges of the groove farther apart. Endwise insertion is preferred. Turning of the bars on the end wires is prevented by providing each end of each bar with a short transverse slot 9 (Fig. 5) connecting the groove and channel. The end wire is pressed into this slot, which thereby prevents the wire from turning in the groove.

The frames are connected together edge to edge by stiff wire hinge loops 11. Each loop has parallel side portions integrally connected by short end portions. As shown in Figs. 1 and 4, the side portions of the loop are mounted in grooves 7 between the ends of the end wires, where they are retained by the converging edges of the grooves. The loop may be inserted from the ends of the grooves before the end wires are inserted, or it may be forced laterally into the grooves by springing the groove edges apart. To permit the frames to pivot on the loops, the opposite sides of each groove are provided with notches 12 beside the end portions of the associated loop. These notches provide spaces, into which the end portions of the loops can swing so that their side portions can turn in the grooves to allow the frames to be folded face to face. The end portions of the loops, spanning the space between the adjoining side bars, are made long enough to permit the frames to lie flat against each other or even to be spaced a little.

One or more rectangular samples 13 of flat glass (Figs. 1 and 2) can be mounted in each frame by placing one side edge of the sample against one of the compressible strips 4 and then pushing it far enough into the channel to permit the opposite edge of the sample to clear the other bar and be placed against the compressible strip therein. The sample is then released, whereupon the first strip will expand partially and force the sample into the opposite channel. Both edges of the sample then will extend into bar channels and be retained in the frame. The strips also form protective cushions for the glass and hold it firmly in place.

Any number of frames can be hinged together in the manner described above, by merely mounting additional loops 11 in the grooves of adjacent frames. When the display is folded, a compact rectangular unit is formed, which can be carried in a box or sample case by itself or with additional like units. Before packing the display in that way, the projecting loop 11 shown in Fig. 2 would be swung back against the center frame. When the display is unfolded, it can be laid flat on a table or desk, or arranged in zig zag fashion and stood on edge.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a folding display device for flat glass samples, a plurality of rectangular frames disposed edge to edge, each frame comprising a pair of spaced parallel side bars having channels extending lengthwise of their inner sides, a stiff wire at each end of the pair of bars and secured rigidly thereto to form the ends of the frame, compressible material substantially filling each channel and adapted to be compressed far enough by one edge of a glass sample to permit the opposite edge of the sample to be inserted in the other channel, whereupon the compressible material in both channels will be only partially compressed and will hold the sample in the channels, and means hinging the frames together so that they can be folded face to face.

2. In a folding display device for flat glass samples, a plurality of rectangular frames disposed edge to edge, each frame comprising a pair of spaced parallel side bars having channels extending lengthwise of their inner sides, the outer side of each bar being provided with a longitudinal groove, a stiff wire at each end of the pair of bars extending across their ends and having bent parallel ends mounted in the ends of said grooves, compressible material in each channel adapted to be compressed by a glass sample having edges inserted in the channels, and means hinging the frames together so that they can be folded face to face.

3. In a display device according to claim 2, each end of each bar being provided with a transverse slot receiving a short portion of the adjoining wire between said parallel ends.

4. In a display device according to claim 2, said parallel ends of the wires being provided with lateral projections pressing into the side walls of said grooves to help hold the wires in place.

5. In a folding display device for flat glass samples, a plurality of rectangular frames disposed edge to edge, each frame comprising a pair of spaced parallel side bars having channels extending lengthwise of their inner sides, the outer side of each bar being provided with a longitudinal groove, a stiff wire at each end of the pair of bars extending across their ends and having bent parallel ends mounted in the ends of said grooves, compressible material in each channel adapted to be compressed by a glass sample having edges inserted in the channels, and connecting elements between the frames and pivotally mounted in the adjoining grooves for hinging the frames together so that they can be folded face to face.

6. In a folding display device for flat glass samples, a plurality of rectangular frames disposed edge to edge, each frame comprising a pair of spaced parallel side bars having channels extending lengthwise of their inner sides, the outer side of each bar being provided with a longitudinal groove, a stiff wire at each end of the pair of bars extending across their ends and having bent parallel ends mounted in the ends of said grooves, compressible material in each channel adapted to be compressed by a glass sample having edges inserted in the channels, the opposite sides of each groove being provided with longitudinally spaced notches, and a stiff wire loop between each pair of frames and having spaced parallel side portions connected by end portions, the side portions of each loop being pivotally mounted in the adjoining grooves with said end portions disposed beside said notches so that the frames can turn on the loops in order to be folded face to face.

7. A display device according to claim 6, in which the distance between the edges of each groove is less than the diameter of the side portion of said wire loop in that groove, whereby to hold the loop in place.

8. In a folding display device for flat glass samples, a plurality of rectangular frames disposed edge to edge, each frame comprising a pair of spaced parallel side bars having channels extending lengthwise of their inner sides, the outer side of each bar being provided with a longitudinal groove, a stiff wire at each end of the pair of bars extending across their ends and having bent parallel ends mounted in the ends of said grooves, and means disposed in said grooves hinging the frames together so that they can be folded face to face.

References Cited in the file of this patent

UNITED STATES PATENTS

| | | |
|---|---|---|
| 1,616,605 | Campbell | Feb. 8, 1927 |
| 1,939,781 | Kelsey | Dec. 19, 1933 |
| 2,297,629 | Meyer et al. | Sept. 29, 1942 |
| 2,374,925 | Corso | May 1, 1945 |